US009575282B2

(12) United States Patent
Kim et al.

(10) Patent No.: US 9,575,282 B2
(45) Date of Patent: Feb. 21, 2017

(54) APPARATUS FOR FIXING SOLID IMMERSION LENS

(71) Applicant: KOREA BASIC SCIENCE INSTITUTE, Daejeon (KR)

(72) Inventors: Geon Hee Kim, Sejong (KR); Ha Yeong Sung, Daejeon (KR); Woo Kang Kim, Chungcheongbuk-do (KR); Kye Sung Lee, Daejeon (KR); Ki Soo Chang, Daejeon (KR); Ki Ju Yee, Daejeon (KR)

(73) Assignee: KOREA BASIC SCIENCE INSTITUTE, Daejeon (KR)

( * ) Notice: Subject to any disclaimer, the term of this patent is extended or adjusted under 35 U.S.C. 154(b) by 228 days.

(21) Appl. No.: 14/389,443

(22) PCT Filed: Sep. 13, 2013

(86) PCT No.: PCT/KR2013/008285
§ 371 (c)(1),
(2) Date: Sep. 30, 2014

(87) PCT Pub. No.: WO2014/175515
PCT Pub. Date: Oct. 30, 2014

(65) Prior Publication Data
US 2015/0316741 A1    Nov. 5, 2015

(30) Foreign Application Priority Data

Apr. 22, 2013    (KR) .................. 10-2013-0043988

(51) Int. Cl.
*G02B 7/02*    (2006.01)
*G02B 27/56*    (2006.01)
(Continued)

(52) U.S. Cl.
CPC ............... *G02B 7/023* (2013.01); *G01Q 60/22* (2013.01); *G02B 7/025* (2013.01); *G02B 7/04* (2013.01); *G02B 27/56* (2013.01)

(58) Field of Classification Search
CPC ........... G02B 7/023; G02B 7/025; G02B 7/04; G02B 7/10; G02B 7/105; G02B 27/56; G01Q 60/22
(Continued)

(56) References Cited

U.S. PATENT DOCUMENTS 4,823,006 A    4/1989    Danilatos
2002/0126289 A1*    9/2002    Marquardt ......... G01N 21/8507
356/436

(Continued)

FOREIGN PATENT DOCUMENTS

JP    S63-57614 U    4/1988
JP    3079431 U    8/2001
(Continued)

*Primary Examiner* — Scott J Sugarman
*Assistant Examiner* — Gary O'Neill
(74) *Attorney, Agent, or Firm* — KORUS Patent, LLC; Seong Il Jeong

(57) ABSTRACT

Provided is an apparatus for fixing a solid immersion lens (SIL) in an optical system. The apparatus includes a first adapter; a second adapter screw-coupled to the inner surface of the first adapter and screw-coupled to the outer surface of a third adapter to pressurize a first O-ring; the third adapter screw-coupled to the inner surfaces of the second adapter and a fourth adapter; the fourth adapter screw-coupled to the outer surface of the third adapter to pressurize a second O-ring; the first and second O-rings elastically fixing an outer surface of a barrel of an infrared ray (IR) objective lens; and an SIL holder mounting the SIL onto the first adapter.

8 Claims, 7 Drawing Sheets

(51) Int. Cl.
*G02B 7/04* (2006.01)
*G01Q 60/22* (2010.01)

(58) Field of Classification Search
USPC .......................... 359/822, 823, 825, 826, 830
See application file for complete search history.

(56) References Cited

U.S. PATENT DOCUMENTS

| | | | |
|---|---|---|---|
| 2010/0321678 A1* | 12/2010 | Koh | G02B 21/33 356/237.5 |
| 2011/0109983 A1 | 5/2011 | Lu | |
| 2011/0149394 A1* | 6/2011 | Wadell | G02B 7/028 359/512 |

FOREIGN PATENT DOCUMENTS

| | | |
|---|---|---|
| JP | 2006-201407 A | 8/2006 |
| JP | 2006-227565 A | 8/2006 |
| KR | 20-1990-0000545 Y1 | 1/1990 |

\* cited by examiner

APPARATUS FOR FIXING SOLID IMMERSION LENS

FIELD OF THE INVENTION

The present invention disclosed herein relates to an apparatus for fixing a solid immersion lens (SIL) mounted in an objective lens of a thermal image microscope, and more particularly, to an apparatus for fixing an SIL, which controls a focal length using a screw tap and includes a flexible structure capable of maintaining a close contact between a specimen and the SIL.

DESCRIPTION OF THE RELATED ART

Generally, there is known a technology of providing a hemispherical SIL having a top surface of a spherical type and a bottom surface of a flat type, which uses an evanescent wave so as to achieve high resolving power which was impossible due to a diffraction of light in a thermal image optical system including a plurality of functional lenses capable of accurately measuring the state of a specimen by applying an infrared ray to a subject.

As a related art about the apparatus for fixing an SIL, Korean Patent Application Publication No. 10-2008-0011814 (published on Feb. 11, 2008) discloses "optical head of apparatus for reproducing recording medium and method for manufacturing the same". In this document, as shown in FIG. 1, an adhesive material 130 is injected to combine an objective lens 120 and a lens holder assembly 110 equipped with a SIL 100, and light reflected by a reflection mirror 140 is acquired by an image sensor. Thereafter, a tile component of the objective lens 120 is adjusted according to an interference pattern. In order to minutely adjust the tilt of the objective lens 120, a piezoelectric linear motor 150 is coupled to a side surface of the lens holder assembly 110, and then is driven before the adhesive material 130 is hardened, thereby controlling the location of the objective lens 120 according to the expansion and contraction of the piezoelectric linear motor 150.

In a typical thermal image optical system including an SIL, as the SIL is applied to an infrared ray (IR) objective lens, there is a difficulty in adjusting the alignment of the optical axis and the focus by an apparatus of fixing the SIL in the optical system. Also, since a screw fastening force is delivered to the objective lens, the performance of the objective lens may be reduced.

Also, in the related art as described above, as the lens holder assembly equipped with the SIL is fixed to the objective lens with the adhesive material and the location of the objective lens is adjusted by the piezoelectric linear motor, a linear motor fastening force acts on the objective lens, reducing the performance of the objective lens. Usually, the mounting end portion of the SIL is close to the specimen within about 50 nm. Accordingly, in the general screw assembly structure and related art, when the end portion of the fixing apparatus and the specimen do not contact each other in a horizontal state, the specimen or the lens may be damaged.

DETAILED DESCRIPTION OF THE INVENTION

Technical Objectives

One of the objectives of the present invention is to provide an apparatus for fixing an SIL, which includes a flexible structure fixing a barrel of an objective lens using an elastic body and maintaining a close contact between a specimen and the SIL, so as to enable an axial alignment of the objective lens of an existing thermal image microscope and prevent a deformation of a precision optical system inside the barrel.

Technical Solution

Embodiments of the present invention provide apparatuses for fixing an SIL in an SIL optical system, comprising: a first adapter equipped with the SIL, adjusting a distance from an IR objective lens and a focal length from a specimen by adjusting a location of the SIL, and in closely horizontal contact with the specimen; a second adapter screw-coupled to an inner surface of the first adapter and screw-coupled to an outer surface of a third adapter to pressurize or depressurize a first O-ring; the third adapter screw-coupled to inner surfaces of the second adapter and a fourth adapter, the first O-ring being disposed at one end portion thereof and a second O-ring being disposed at the other end portion thereof; the fourth adapter screw-coupled to the outer surface of the third adapter to pressurize or depressurize the second O-ring; the first and second O-rings elastically fixing an outer surface of a barrel of the IR objective lens by the expansion due to pressurizing forces of the second adapter and the fourth adapter; and an SIL holder mounting the SIL onto the first adapter.

In some embodiments, the first adapter may be formed to be a cylinder with a closed surface at one side thereof. The cylinder may have a plurality of slits performing a spring function at one side of the inner surface of the cylinder and may include a first screw part adjusting the distance from the IR objective lens and the focal length from the specimen at the other side of the inner surface of the cylinder while being coupled to the second adapter. The closed surface may have a through-hole mounted with the SIL at about the center of the closed surface and may allow a user to observe the specimen. The closed surface may have a plurality of screw holes for installing the SIL holder mounted with the SIL formed at a predetermined distance around the through-hole.

In other embodiments, the second adapter may be coupled to the third adapter and may be formed to have a cylindrical shape so as to compress the first O-ring to deform the O-ring. The second adapter may include a stopper part at one side thereof, surrounding a through-hole into which the barrel of the objective lens is inserted and a second screw part that pressurizes or depressurizes the first O-ring by coupling to the third adapter on the inner surface of the cylinder at the other side thereof. The second adapter may include a third screw part coupled to the first screw part of the first adapter along a predetermined length on the outer surface of the cylinder.

In still other embodiments, the third adapter may be coupled to the second adapter and the fourth adapter and may be formed to be a cylinder opened at both sides thereof so as to support the first and second O-rings deformed by a fastening force of the second and fourth adapters at both end portion thereof, and may include a fourth screw part formed along a whole length of the outer surface thereof.

In even other embodiments, the fourth adapter may be formed to have a cylindrical shape so as to pressurize or depressurize the second O-ring by coupling to the third adapter. The fourth adapter may be formed to be a cylinder with one side opened and may include a fifth screw part configured to couple to a fourth screw part of the third adapter on the inner surface thereof, and may include a stopper part at the other side thereof, surrounding a through-hole into which the barrel of the objective lens is inserted, whereby the fourth adapter is a component for reference position.

In yet other embodiments, the first and second O-rings may be formed of a highly elastic rubber material and may have the diameter of about a half of the difference between the outer diameter and the inner diameter of the third adapter in a free state where a pressurizing force does not act, and the SIL holder may be installed on a closed surface of the first adapter by a plurality of screws to fix the SIL to an optical axis.

Effects of the Invention

Since the apparatus for fixing an SIL is elastically coupled to an IR objective lens using an O-ring with an elastic force, the alignment of the optical axis and the adjustment of the focus can be easily achieved.

When an external force acts, the performance of the objective lens decreases easily. Since the apparatus for fixing an SIL is elastically coupled to the objective lens using an O-ring with an elastic force, the fastening force by screw coupling does not act on the objective lens. Accordingly, the performance reduction of an optical system can be prevented.

Also, a close contact is needed between the specimen and the bottom surface of the SIL. Accordingly, when the measurement surface of the specimen and the bottom surface of the SIL are not maintained at a horizontal state, a spring function is given to the apparatus for fixing an SIL. In this case, even though an inclination occurs on the specimen, the apparatus for fixing an SIL can become in horizontal contact with the specimen, and thus a distribution load can be evenly applied to the specimen. Accordingly, the specimen or the SIL can be prevented from being damaged.

DETAILED DESCRIPTION OF PREFERRED EMBODIMENTS

Preferred embodiments of the present invention will be described below in more detail with reference to the accompanying figures.

Figure 1:
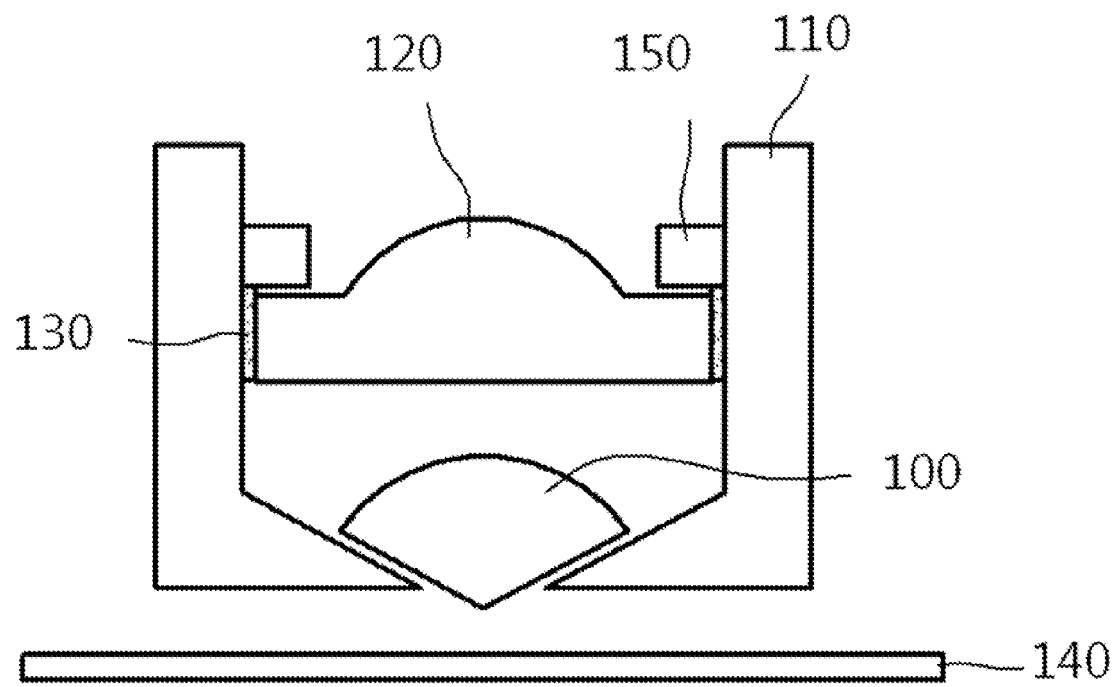
FIG. 1 is a view illustrating a typical structure equipped with a solid immersion lens (SIL)
Figure 2:
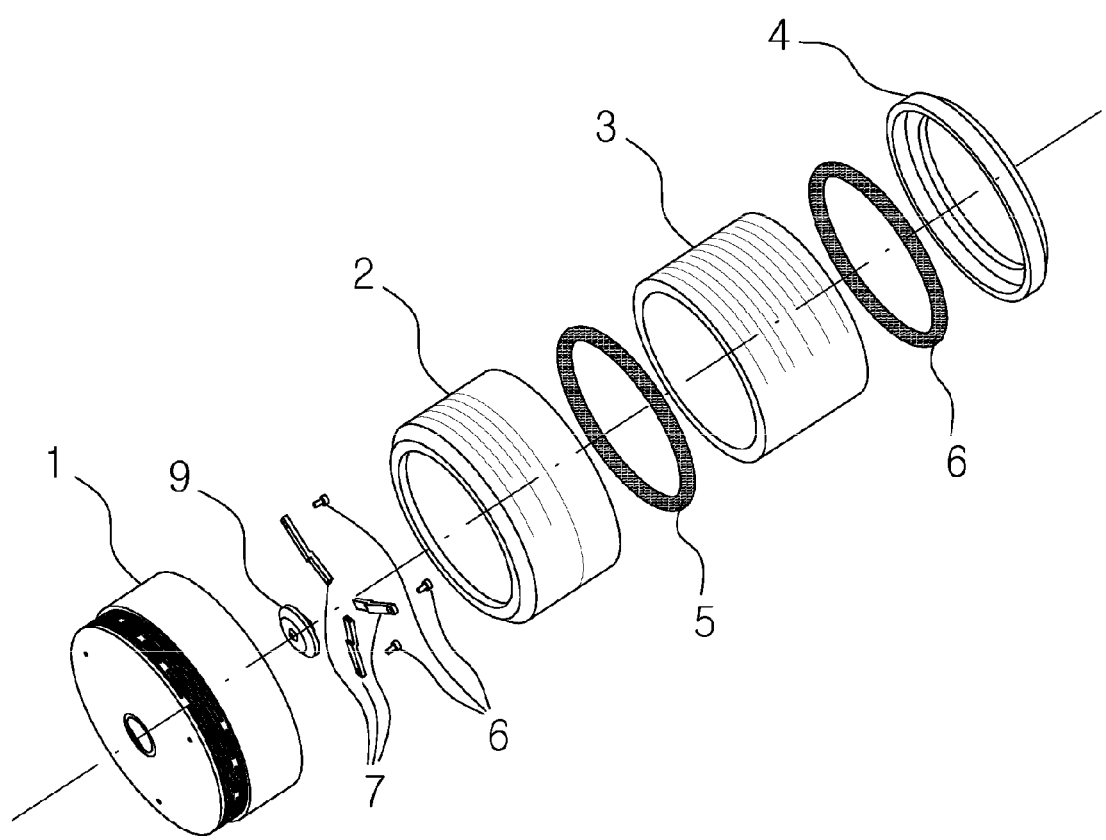
FIG. 2 is an exploded perspective view illustrating an apparatus for fixing an SIL according to an embodiment of the present invention.
Figure 3:
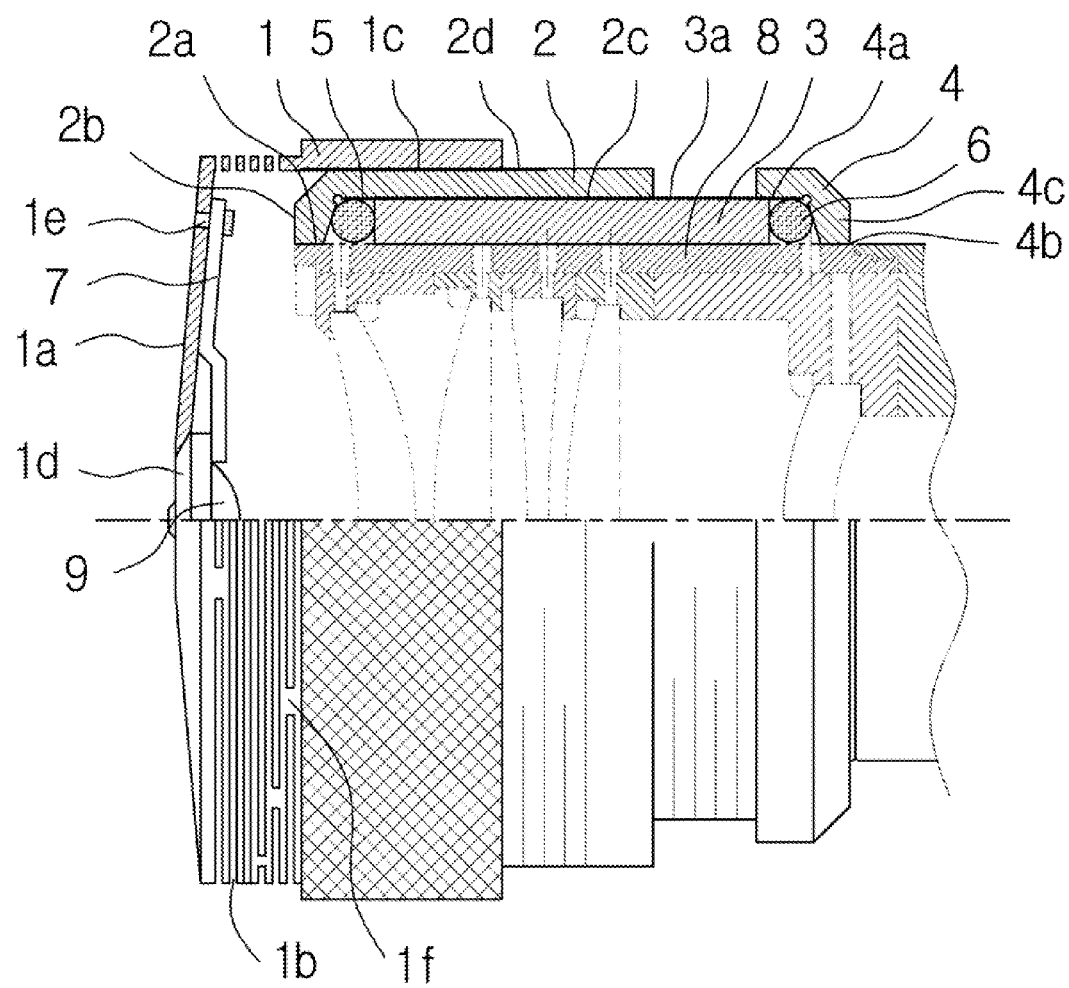
FIG. 3 is a view illustrating an assembly relationship between an apparatus for fixing an SIL and a barrel according to an embodiment of the present invention.

As shown in FIGS. 2 and 3, an apparatus for fixing an SIL according to an embodiment of the present invention may include a first adapter 1, a second adapter 2, a third adapter 3, a fourth adapter 4, a first O-ring 5, a second O-ring 6, and a SIL holder 7. The apparatus for fixing an SIL may be fixed to an outer surface of a barrel 8 of an IR objective lens by an elastic force of the O-ring by coupling the third and fourth adapters 3, 4 and then compressing the two O-rings 5, 6 by a movement of a screw tap to allow the two O-rings 5, 6 to expand toward an outer circumferential surface of the barrel 8 of the IR objective lens.

The first adapter 1 may have a plurality of slits 1b that perform a spring function so as to be closely in horizontal contact with a specimen. An SIL may be disposed on the inner surface of the first adapter 1 while adjusting the focal length from the specimen by adjusting the distance between the SIL and the IR objective lens using a height adjustment by the screw tap that is coupled.

Figure 4:
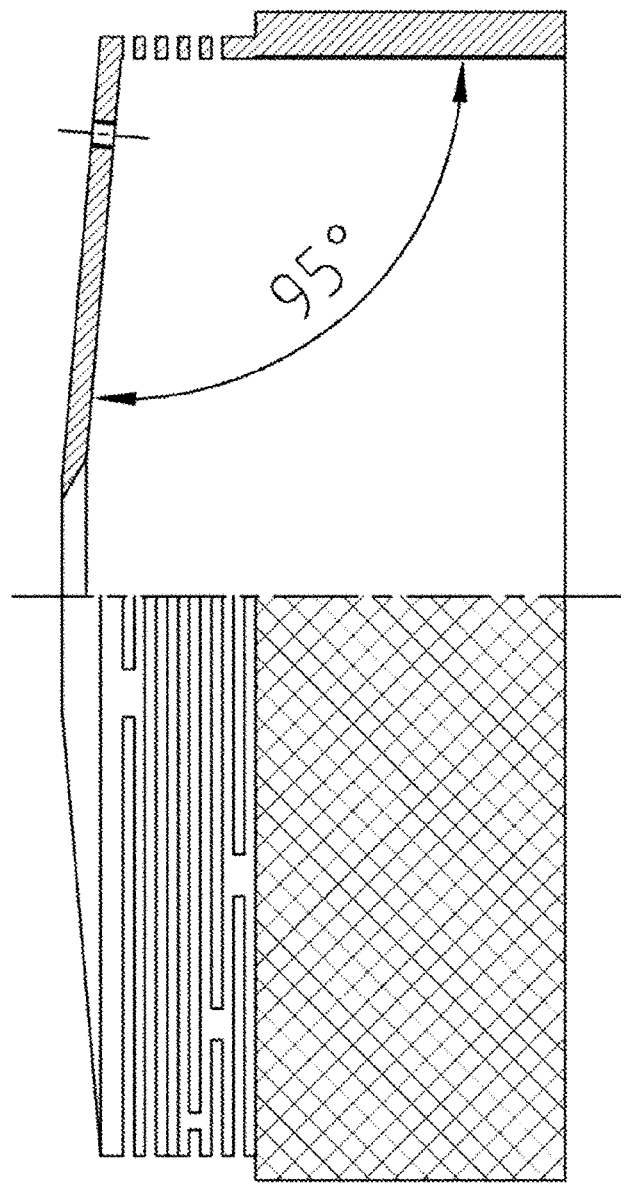
FIG. 4 is a view illustrating a first adapter of an apparatus for fixing an SIL according to an embodiment of the present invention.

More specifically, the first adapter 1, as shown in FIG. 4, may be formed to have a cylindrical shape that has a closed surface 1a at one side thereof and an opening at the other side thereof. The plurality of slits 1b may be formed at a predetermined distance in a predetermined region of the circumference at the side of the closed surface 1a of the cylinder. Also, a first screw part 1c may be formed on the inner surface at the side of the opening of the cylinder to adjust the focal length from the specimen while being coupled to the second adapter 2.

A transmission aperture 1d for observing the specimen may be formed at the center of the closed surface 1a to be mounted with the SIL 9. Also, a plurality of screw holes 1e for installing an SIL holder 7 equipped with the SIL may be formed at a predetermined distance around the transmission aperture 1d.

The plurality of slits 1b may be formed at a vertical wall of the cylinder by crossing connection parts 1f in which the slits 1b are not formed. The plurality of slits 1b may be arranged in six rows within a range of a third to a fourth of the length of the first adapter 1. One slit 1b may be formed to divide the circumference into three equal parts such that the connection parts 1f are disposed in a zigzag pattern at a predetermined distance.

Figure 6:
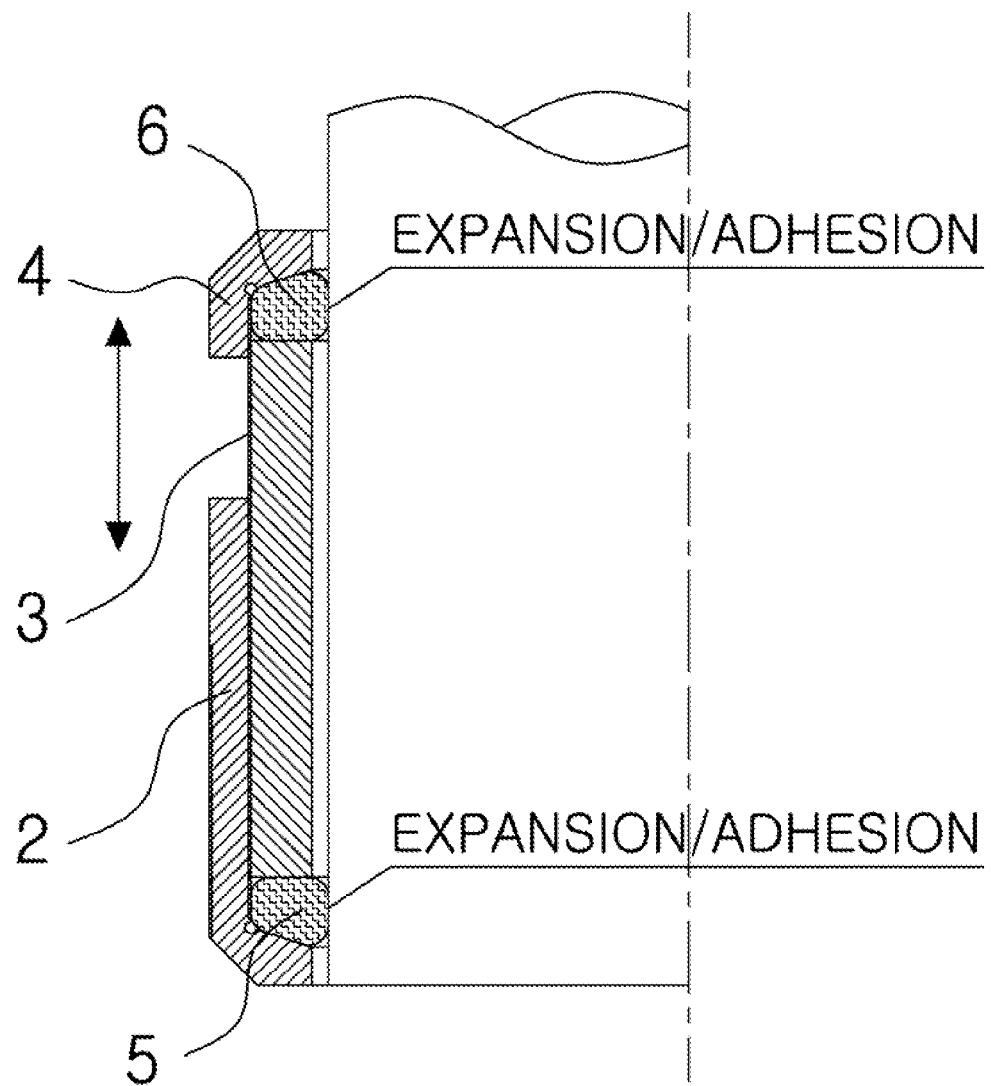
FIG. 6 is a view illustrating an apparatus for fixing an SIL elastically fixed to a barrel, using an O-ring according to an embodiment of the present invention.
Figure 7:
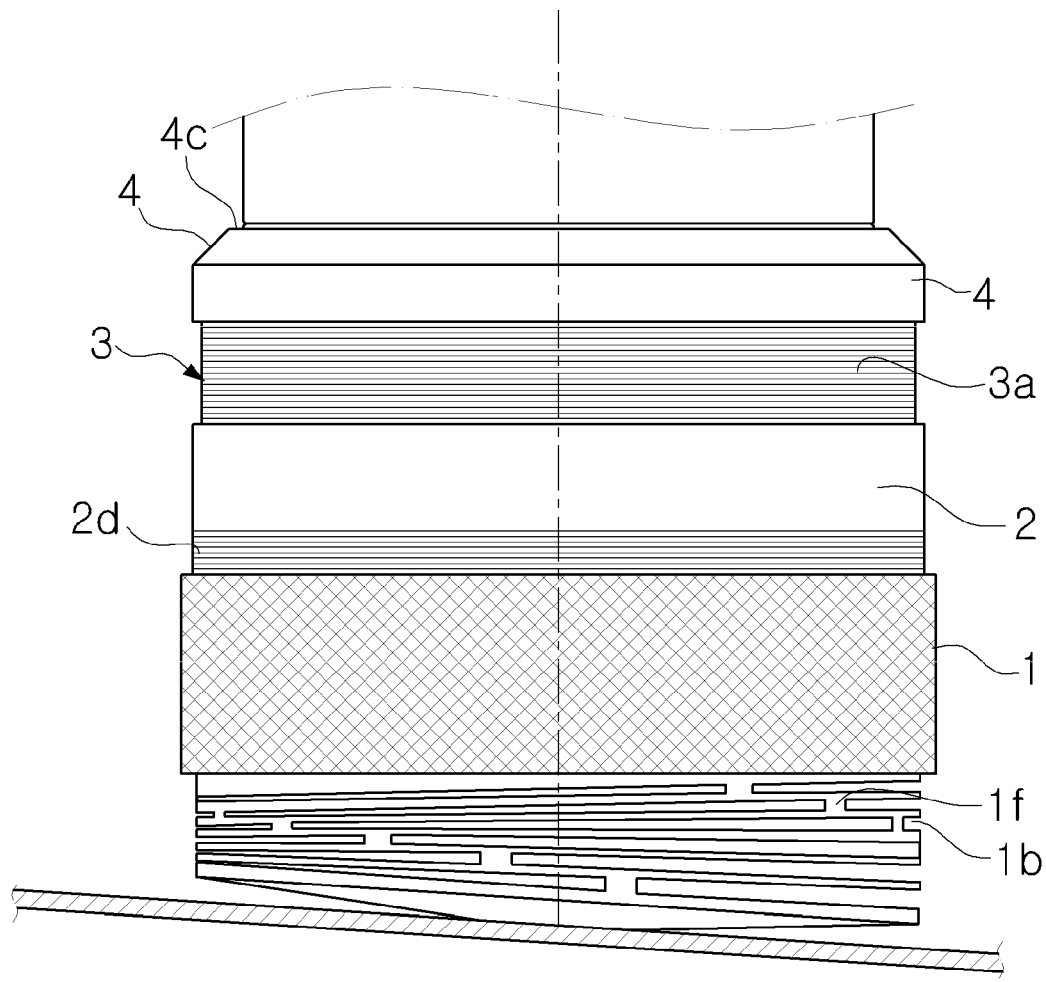
FIG. 7 is a view illustrating a state of horizontal contact between an apparatus for fixing an SIL and a specimen according to an embodiment of the present invention.

As shown in FIG. 6, since the first adapter 1 has one side or the whole thereof to be extended or contracted when an external force or an impact acts on the end portion of the first adapter 1 due to the plurality of slits 1b, the first adapter 1 may have a shock absorbing function, i.e., spring function. Also, even though the specimen is not disposed to be horizontal, the specimen and the SIL may be allowed to be maintained at the horizontal state, allowing the specimen and the SIL to be close to each other in a horizontal state.

That is, even when an inclination occurs between the specimen and the SIL which need a close contact with each other, the slits 1b formed in the apparatus for fixing an SIL may allow the specimen and the SIL to be in close contact with each other in a horizontal direction. Thus, when the SIL is allowed to be adhered closely to the specimen, an eccentricity may not occur, and thus a uniform distributed load, not a concentrated load, may act, thereby preventing the specimen and the SIL from being damaged.

Also, the closed surface 1a of the first adapter 1 may be formed to incline about 95 degrees with respect to the vertical wall of the cylinder, and thus may form an inclination protrusion surface that protrudes in the opposite direction to the cylinder. A certain surface around the transmission aperture 1d formed at the center of the protrusion surface may be formed to be a flat surface perpendicular to the central axis of the transmission aperture 1d, allowing one side surface of the transmission aperture 1d and the specimen to be adhered closely to each other in a horizontal direction.

As shown in FIGS. 2 and 3, the second adapter 2 may be coupled to the third adapter 3, and may be formed to have a cylindrical shape so as to compress the first O-ring 5 to deform the O-ring 5. The second adapter 2 may include a stopper part 2b at one side thereof, surrounding a through-hole 2a into which a barrel is inserted, and a second screw part 2c that pressurizes or depressurizes the first O-ring 5 by coupling to the third adapter 3 on the inner surface of the cylinder at the other side thereof. Also, the second adapter 2 may have a third screw part 2d coupled to the first screw part 1c of the first adapter 1 along a predetermined length on the outer surface of the cylinder. That is, the second screw part 2c may be formed on the whole of the inner circumferential surface of the second adapter 2. The third screw part 2d coupled to the first adapter 1 may be formed on one side portion of the outer circumferential surface of the second adapter 2, but a screw part may not be formed on the other side portion thereof.

As shown in FIGS. 2 and 3, the third adapter 3 may be coupled to the second adapter 2 and the fourth adapter 4. The third adapter 3 may move by fastening forces according to the screw coupling with the second and fourth adapters 2, 4. The third adapter 3 may pressurize the first and second O-rings 5, 6 to deform the shape of the O-rings 5, 6. For this, the third adapter 3 may be formed to be opened at both sides thereof such that a second adhesion action occurs on the barrel 8 of the IR objective lens and the apparatus for fixing an SIL according to the shape change of the O-rings 5, 6. Also, a fourth screw part 3a may be formed along the whole length of the outer circumferential surface thereof. The fourth screw part 3a may be coupled to the second screw part 2c of the second adapter 2 and a screw part of the fourth adapter 4. The inner circumferential surface of the third adapter 3 may be formed to be flat without a screw part.

As shown in FIGS. 2 and 3, the fourth adapter 4 may be a component for reference position, and may be formed to have a cylindrical shape so as to pressurize or depressurize the second O-ring 6 by coupling to the third adapter 3. The fourth adapter 4 may have one side opened, and may have a fifth screw part 4a coupled to the fourth screw part 3a of the third adapter 3 on the inner surface thereof. The fourth adapter 4 may have a through-hole 4b into which the barrel of the objective lens is inserted at the other side thereof. The fourth adapter 4 may include a stopper part 4c formed around the through-hole 4b to apply a fastening force by screw coupling to the second O-ring 6.

As shown in FIGS. 2 and 3, the first O-ring 5 may be formed of a highly elastic rubber material, and may be disposed between the second adapter 2 and the third adapter 3 to be changed in shape by a compressive force due to the screw coupling of the second and third adapters 2 and 3. The diameter of the first O-ring 5 may be about a half of the difference between the outer diameter and the inner diameter of the third adapter 3 in a free state where a pressurizing force does not act such that a first adhesion action occurs on the barrel 8 of the IR objective lens and the apparatus for fixing an SIL due to the change in shape. That is, the first O-ring 5 may be formed to have a thickness equal to the thickness of the third adapter 3.

As shown in FIGS. 2 and 3, the second O-ring 6 may be formed of a highly elastic rubber material, and may be disposed between the third adapter 3 and the fourth adapter 4 to be changed in shape by a compressive force due to the screw coupling of the third and fourth adapters 3, 4. The diameter of the second O-ring 6 may be about a half of the difference between the outer diameter and the inner diameter of the third adapter 3 in a free state where a pressurizing force does not act such that the second adhesion action occurs on the barrel 8 of the IR objective lens and the apparatus for fixing an SIL due to the change in shape. That is, similarly to the first O-ring 5, the second O-ring 6 may be formed to have a thickness equal to the thickness of the third adapter 3.

Figure 5:
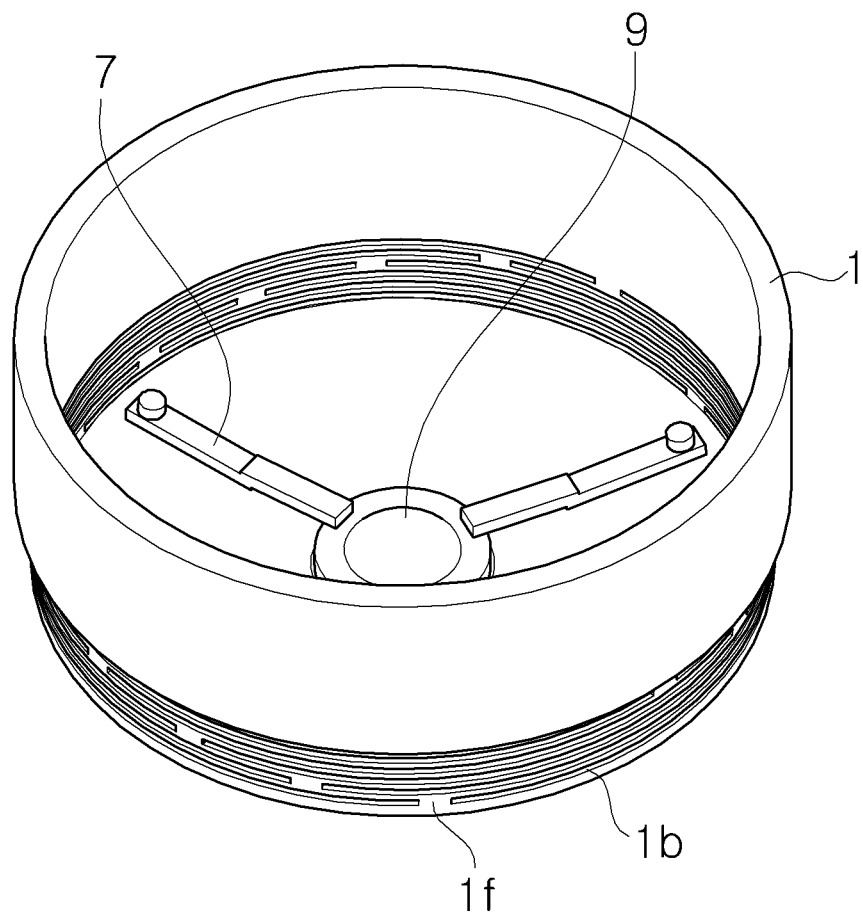
FIG. 5 is a view illustrating an SIL mounted in an apparatus for fixing an SIL according to an embodiment of the present invention.

As shown in FIG. 5, the SIL holder 7 have a predetermined length, and may include an inclination part at one side thereof. The SIL may be fitted into the inclination part to be fixed. The SIL holder 7 may be fixedly installed by a screw hole 1e formed in the closed surface 1a of the first adapter 1, and may serve to fix the SIL to the optical axis.

One embodiment of the present invention provides the apparatus for fixing an SIL including the first adapter, the second adapter, the third adapter, the first and second O-rings, and the SIL holder. The difficulties in adjusting the optical alignment and the focus can be overcome through the screw movement of the first adapter equipped with the SIL. Also, a reduction in performance of the objective lens caused by a screw fastening force acting on the objective lens can be prevented by coupling the apparatus for fixing an SIL to the barrel of the objective lens through the elastic expansive force of the O-ring. In addition, the horizontally close state between the SIL and the specimen can be maintained through the slits of the first adapter having a spring function, thereby improving the performance of the SIL and preventing the specimen and the SIL from being damaged.

What is claimed is:

1. An apparatus for fixing a solid immersion lens (SIL) in an SIL optical system, comprising:
   a first adapter at which the SIL is mounted the first adaptor being configured to adjust a distance from an infrared ray (IR) objective lens and a focal length from a specimen by adjusting a location of the SIL, to be in close horizontal contact with the specimen;
   a second adapter screw-coupled to an inner surface of the first adapter and screw-coupled to an outer surface of a third adapter to pressurize or depressurize a first O-ring, the first O-ring being disposed between the second adaptor and one end portion of the third adaptor;
   the third adapter screw-coupled to inner surfaces of the second adapter and a fourth adapter;
   the fourth adapter screw-coupled to the outer surface of the third adapter to pressurize or depressurize a second O-ring, the second O-ring being disposed between the other end portion of the third adaptor and the fourth adaptor;
   the first and second O-rings configured to elastically fix an outer surface of a barrel of the IR objective lens by an expansion due to pressurizing forces of the second adapter and the fourth adapter; and
   an SIL holder configured to mount the SIL onto the first adapter.

2. The apparatus of claim 1, wherein:
   the first adapter is formed to have a shape of a hollow cylinder with a side-surface at one side portion of the first adaptor;
   the first adaptor comprises
      a plurality of slits configured to perform a spring function at the one side portion, and
      a first screw part configured to adjust the distance from the IR objective lens and the focal length from the specimen and disposed on an inner surface of the other side portion of the first adaptor while being coupled to the second adapter;

the side-surface has a through-hole formed at the center thereof which allows a user to observe the specimen, the SIL being mounted at the center of the side-surface; and the side-surface has a plurality of screw holes for installing the SIL holder configured to mount the SIL, the screw holes being formed at a predetermined distance around the through-hole.

3. The apparatus of claim 1, wherein:

the second adapter is formed to have a shape of a hollow cylinder; and the second adapter comprises a stopper part at one side portion thereof, the stopper part being configured to surrounding a through-hole into which the barrel of the objective lens is inserted, a second screw part on an inner surface of the other side portion thereof, the second screw part being configured to pressurize or depressurize the first O-ring by coupling to the third adapter; and a third screw part configured to couple to the first adapter along a predetermined length on an outer surface of the second adapter.

4. The apparatus of claim 1, wherein the third adapter is formed to have a shape of a hollow cylinder opened at both sides thereof so as to support the first and second O-rings deformed by a fastening force of the second and fourth adapters at both end portions thereof, and comprises a fourth screw part formed along a whole length of the outer surface thereof.

5. The apparatus of claim 1, wherein:

the fourth adapter is formed to have a shape of a hollow cylinder; and the fourth adapter comprises a fifth screw part configured to couple to the third adapter on the inner surface of one side portion thereof, and a stopper part at the other side portion thereof, the stopper part being configured to surround a through-hole into which the barrel of the objective lens is inserted.

6. The apparatus of claim 1, wherein the first and second O-rings are formed of a highly elastic rubber material and have a diameter of about a half of the difference between the outer diameter and the inner diameter of the third adapter where when a pressurizing force does not act, and the SIL holder is installed on a side-surface of the first adapter by a plurality of screws to fix the SIL to an optical axis.

7. The apparatus of claim 2, wherein the plurality of slits are formed at a vertical wall of the first adapter by crossing connection parts in which the slits are not formed and are arranged in six rows within a range of about a third to about a fourth of a length of the first adapter, and one slit is formed to divide a circumference into three equal parts so as to absorb an external force when the external force acts on an end portion of the first adapter through the plurality of slits.

8. The apparatus of claim 7, wherein the side-surface of the first adapter inclines about 95 degrees with respect to the vertical wall of the first adapter so as to become a protrusion surface protruding from a distal end of the first adapter to the specimen and thus facilitate a contact between the through-hole located over the center of the protrusion surface and the specimen.

* * * * *